United States Patent
Meltzer et al.

(10) Patent No.: US 6,984,709 B2
(45) Date of Patent: Jan. 10, 2006

(54) ORGANOMETALLIC-FREE POLYURETHANES HAVING LOW EXTRACTABLES

(75) Inventors: A. Donald Meltzer, Akron, OH (US); Julius Farkas, North Ridgeville, OH (US)

(73) Assignee: Noveon IP Holdings Corp., Cleveland, OH (US)

( * ) Notice: Subject to any disclaimer, the term of this patent is extended or adjusted under 35 U.S.C. 154(b) by 0 days.

(21) Appl. No.: 10/325,101

(22) Filed: Dec. 20, 2002

(65) Prior Publication Data

US 2004/0122202 A1    Jun. 24, 2004

(51) Int. Cl.
*C08G 18/48*    (2006.01)

(52) U.S. Cl. .................. 528/76; 528/85; 428/423.7

(58) Field of Classification Search .................. 528/76, 528/85; 428/423.7
See application file for complete search history.

(56) References Cited

U.S. PATENT DOCUMENTS

| | | | |
|---|---|---|---|
| 3,344,121 A * | 9/1967 | Phelisse et al. ............... | 528/85 |
| 3,399,151 A | 8/1968 | Kaiser | |
| 4,131,731 A | 12/1978 | Lai et al. | |
| 4,245,081 A | 1/1981 | Quiring et al. | |
| 4,371,684 A | 2/1983 | Quiring et al. | |
| 4,895,764 A * | 1/1990 | Lehner et al. ............ | 428/425.9 |
| 5,047,495 A | 9/1991 | Kolycheck | |
| 5,159,053 A | 10/1992 | Kolycheck et al. | |
| 5,374,704 A | 12/1994 | Muller et al. | |
| 5,574,092 A | 11/1996 | Oriani et al. | |
| 5,908,690 A | 6/1999 | Schultze et al. | |
| 5,959,059 A | 9/1999 | Vedula et al. | |
| 6,022,939 A | 2/2000 | Pudleiner et al. | |
| 6,093,342 A | 7/2000 | Falke et al. | |
| 6,294,638 B1 | 9/2001 | Manning et al. | |
| 6,607,814 B2 * | 8/2003 | Pickett et al. ................ | 428/212 |

FOREIGN PATENT DOCUMENTS

| EP | 0 294 704 A2 | 12/1988 |
|---|---|---|
| EP | 0 371 736 A2 | 6/1990 |
| JP | 7-275699 | * 10/1995 |
| SU | 1193196 | * 11/1985 |
| WO | WO 97/42248 | 11/1997 |

* cited by examiner

*Primary Examiner*—Rachel Gorr
(74) *Attorney, Agent, or Firm*—Joe A. Powell; Daniel J. Hudak, Jr.; Thoburn T. Dunlap

(57) ABSTRACT

Breathable thermoplastic polyurethanes are prepared from the reaction of a polyol component, a polyisocyanate component, and a chain extender in the presence of a metal-free catalyst. The metal-free catalyst comprises a polyalcohol amine, a tertiary amine catalyst, or a combination thereof. The polyurethanes of the present invention are suitable for film applications as they form breathable films which are permeable to water vapor but not air or water. The polyurethane compositions are substantially metal-free, have low extractables, and excellent melt strength.

18 Claims, No Drawings

ORGANOMETALLIC-FREE POLYURETHANES HAVING LOW EXTRACTABLES

FIELD OF THE INVENTION

The present invention relates to polyurethane compositions, preferably thermoplastic polyurethane compositions. The polyurethane compositions are substantially organometallic-free, being prepared without an organometallic catalyst. Polyurethane compositions of the present invention have low extractables and excellent melt strength. The polyurethanes are suitable for film applications, such as breathable films, which advantageously can be produced without holes or openings making the films permeable to water vapor but not air.

BACKGROUND OF THE INVENTION

Polyurethanes currently prepared in the industry and known in the art generally utilize metal-based catalysts such as stannous and other metal carboxylates. U.S. Pat. No. 5,959,059 to Vedula et al. discloses that suitable polyurethane catalysts include stannous octoate, dibutyltin dilaurate, phenyl mercuric propionate, lead octoate, iron acetylacetonate, and magnesium acetylacetonate. While the melt strength of metal-based catalyzed polyurethane films is sufficient, it would be desirable to further increase melt strength or decrease the melt index.

U.S. Pat. No. 5,908,690 relates to a reportedly breathable and antistatic film produced without a support by extrusion, the film having a DIN friction coefficient of less than 0.8 and consisting of thermoplastic polyurethane elastomer resins with a melt flow rate, as measured at 190° C. under a load of 10 kg, of at most 70, the soft segment of the elastomer resins consisting of polyethylene oxide and/or containing ethylene oxide reaction products and the relative percentage by weight of the soft segment in the polyurethane resin being between 35% by weight and 60% by weight, based on the total weight of the polyurethane used.

WO 97/42248 relates to a rigid thermoplastic polyurethene (RTPU) comprising units of butane diol (BDO) and a polyethylene glycol (PEG) of the type HO—$(CH_2CH_2O)_n$—H, where n is an integer from 2 to 6. The RTPU of the invention reportedly addresses a problem in the art by providing a potentially lower-cost alternative to an RTPU prepared from hexane diol. The example presented utilizes an organotin catalyst.

U.S. Pat. No. 5,574,092 discloses rigid thermoplastic polyurethanes having a $T_g$ of at least 50° C. having a sufficient concentration of units derived from an aromatic diol to reportedly lower the temperature at which the rigid thermoplastic polyurethane can be melt processed, with a flex modulus of at least 100,000 psi. These rigid polyurethanes are not for use as breathable materials.

U.S. Pat. No. 5,959,059 discloses that tertiary amines such as triethylene diamine can also serve as effective catalysts for polyurethane polymerizations. The amount of the tertiary amine catalyst utilized is very low, and is in the amount from about 50 to about 100 parts by weight per million parts by weight of the end polymer formed. However, the low amount of tertiary amine catalyst has been found to produce less than desirable effects when producing thermoplastic polyurethanes exhibiting reasonably fast kinetics as indicated by suitable low residual amounts of NCO, and low initial melt index values.

SUMMARY OF THE INVENTION

The present invention relates to thermoplastic polyurethane compositions which are prepared in the presence of a polyalcohol amine catalyst, a tertiary amine catalyst, or a combination thereof, and articles prepared therefrom. Polyurethane compositions prepared according to the invention are substantially free of extractable metal-based catalysts or organometallic products. The organometallic-free polyurethane compositions are thus environmentally friendly. The polyurethane compositions are thermoplastic and thus can be dissolved and cast, molded, or extruded into a desired shape.

The polyurethane compositions of the present invention can be utilized to prepare breathable films which are permeable to water vapor but impermeable to air, and accordingly have excellent water vapor transmissibility. The breathable films are monolithic and thus free of undesirable pin holes or other micro-apertures. The polyurethanes can be formed into breathable films for use as roofing membranes and house wrap applications, as well as apparel. Catalysts disclosed by the present invention have been found to improve melt strength of polyurethane compositions as indicated by a decrease in the melt flow index thereof.

Polyurethane compositions as described herein can be prepared by numerous methods known in the art, and preferably a one-shot polymerization process, wherein all of the reactants are combined simultaneously or substantially simultaneously and reacted. The one-shot process is preferably performed in an extruder. The resulting polyurethane compositions can be further processed to form desired articles or products. These and other advantages of the present invention will become more apparent by referring to the Detailed Description of the Invention and the illustrated Examples.

DETAILED DESCRIPTION OF THE INVENTION

The term "polyurethane composition" when utilized throughout the specification can refer to the composition containing reagents utilized to form polyurethane, or a composition subsequent to reaction of polyurethane forming reagents by some process or mechanism. The thermoplastic polyurethane polymers of the present invention comprise the reaction product of polyols, preferably polyether-based polyols; polyisocyanates, preferably diisocyanates; chain extenders; and at least one catalyst.

Catalysts

The thermoplastic polyurethane polymers of the present invention are prepared by reacting the polyurethane forming components in the presence of at least a polyalcohol amine catalyst, a tertiary amine catalyst, or a combination thereof. Unlike a traditional catalyst, the present invention polyalcohol amine catalysts are consumed during the reaction and become bound in the polymeric chains. Thus, the polyalcohol amine catalysts are non-extractable, unlike typical polyurethane catalysts. The polyurethane compositions are free or substantially free of an organometallic or a metal-based catalyst. The term substantially free can be defined as having less than about 50 parts, desirably less than about 10 parts, and preferably less than about 1 part of an organometallic or a metal-based catalyst by weight per one million parts by weight of the polyurethane forming components.

By polyalcohol amine catalyst, it is meant that an amine-based compound having at least two hydroxyl groups is utilized in a polyurethane forming reaction as a catalyst. Polyalcohol amines can generally be described as a compound having at least one nitrogen atom which has three covalent bonds or is covalently bonded to three substituents, i.e., atoms or groups of atoms, wherein the substituents collectively include at least two hydroxyl groups, and wherein at most one of the substituents is a hydrogen directly attached to the nitrogen. Thus the polyalcohol amine catalysts are secondary or tertiary polyalcohol amine compounds.

Preferred polyalcohol amine catalysts can be defined by the formula:

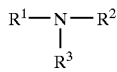
(I)

wherein $R^1$ and $R^2$ independently, represent linear or branched, alkyl, cycloalkyl or alkylaryl groups having from 1 to about 20 carbon atoms, with 2 to about 6 carbon atoms being preferred, and wherein $R^3$ represents hydrogen, linear or branched, alkyl, cycloalkyl or alkylaryl groups having from 1 to about 20 carbon atoms, with 2 to about 6 carbon atoms being preferred, with the proviso that at least the "R" groups other than hydrogen collectively have a total of at least two hydroxyl groups.

Suitable polyalcohol amines include, but are not limited to, triethanolamine, diethanolamine, diisopropanolamine, N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, N-allyl diethanolamine, N-methyl diisopropanolamine, N-ethyl diisopropanolamine, N-propyl diisopropanolamine, N-butyl diisopropanolamine, cyclohexyl diisopropanolamine, bis(2-hydroxyethyl)amino-2-propanol, 2-bis(2-hydroxyethyl)amino-2-(hydroxymethyl)-1,3-propanediol, 1,3-bis[tris(hydroxymethyl)methylamino]propane, N,N'bis(hydroxyethylene)ethylenediamine, 1-[N,N-bis(2-hydroxyethyl)amino]-2-propanol, 1,4-bis(hydroxyethylpiperazine, 1-[2-(2-hydroxyethoxy)ethyl]piperazine, 2,2-bis(hydroxymethyl)-2,2',2"-nitrilotriethanol, with triethanolamine, bis(2-hydroxyethyl)amino-2-propanol, 2-bis(2-hydroxyethyl)amino-2-(hydroxymethyl)-1,3-propanediol, and 1,3-bis[tris(hydroxymethyl)methylamino] propane being preferred.

Chemical formulas of a few representative polyalcohol amines are:

Triethanolamine: $N(CH_2CH_2OH)_3$

Diethanolamine: $NH(CH_2CH_2OH)_2$ bis(2-hydroxyethyl)amino-2-propanol: $CH_3CH(OH)CH_2N(CH_2CH_2OH)_2$ 2-bis(2-hydroxyethyl)amino-2-(hydroxymethyl)-1,3-propanediol:

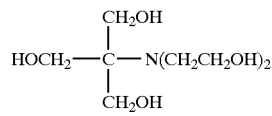

1,3-bis[tris(hydroxymethyl)methylamino] propane:

$(HOCH_2)_3CNHCH_2CH_2CH_2NHC(CH_2OH)_3$

The polyalcohol amine catalysts also include polyalcohol melamine derivatives such as those having the formula:

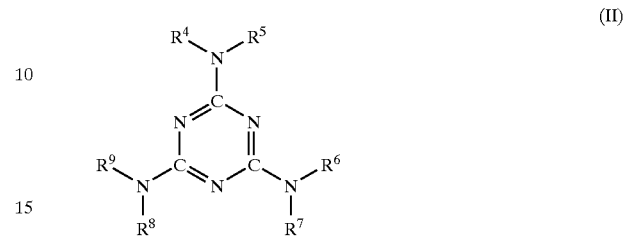
(II)

wherein $R^4$, $R^5$, $R^6$, $R^7$, $R^8$ and $R^9$, independently, represent linear or branched alkyl, cycloalkyl or alkylaryl groups having from 1 to about 20 carbon atoms, with 2 to about 6 carbon atoms being preferred, wherein $R^7$ and $R^8$ can additionally independently represent hydrogen, with the proviso that at least one of the "R" groups other than hydrogen collectively have at least two hydroxyl substituents thereon. Examples of polyalcohol melamine derivatives include, but are not limited to, trimethylolmelamine, hexamethylolmelamine, and dimethylolmelamine.

The polyalcohol amines catalysts by definition also include polyalcohol-containing polyamide adducts of alkylene oxide including compounds such as ethylenediamine adducts which are a reaction product of ethylenediamine and propylene oxide or ethylene oxide or mixtures thereof; and diethylenetriamine adduct which is the reaction product of diethylenetriamine with propylene oxide, ethylene oxide or mixtures thereof. The equivalent weight of the polyalcohol-containing polyamide adducts or polyols is between about 100 and about 5,000, preferably between about 250 and about 2,000.

The use of a catalyst in the polyurethane composition accelerates the rate of the reaction. The alcohol functionality of the polyalcohol amine catalyst participates in the polyurethane-forming reaction. The catalyst is thus bonded to the polymeric chains and non-extractable. An additional advantage is the relative immobilization of the catalyst which could otherwise relatively easily diffuse within the resulting polyurethane and accelerate the rate of retrourethanization. The retrourethanization is particularly prevalent in thermoplastic polyurethanes that have absorbed moisture. The reaction results in a reduction in the Mw of the TPU with corresponding drops in physical properties such as tensile strength, with the generation of urea and MDA, the latter being of significant concern in breathable films.

The polyalcohol amines can be utilized in the polyurethane forming reaction of the invention in amounts wherein the nitrogen content of the thermoplastic polyurethane from the polyalcohol amine ranges generally from about 0.075 to about 2.0 mol %, desirably from about 0.085 to about 1.75 mol %, and preferably from about 0.095 to about 1.5 mol % based on the total moles of the polyurethane forming components (i.e., chain extenders, polyols, polyisocyanates and catalyst) present in the composition. The amine-containing polyalcohols present in the polyurethane compositions of the invention, whether from the polyalcohol amines or other sources, preferably should not be used in amounts greater than two equivalent percent of the total content of all Zerewitinoff active hydrogen atoms. The polyalcohol amine catalysts are utilized in sufficient amounts so that the immediate NCO level of the polyurethane polymer is less than about 0.3 percent, and/or the oven aged NCO level is about zero percent.

In yet a further embodiment of the present invention, it has been found that catalysts are required for the formation of breathable thermoplastic polyurethane polymer compositions, and while not all catalysts are suitable (e.g., metal-based or organometallic catalysts such as bismuth or titanium-based catalysts), tertiary amines are effective catalysts in reactions to form the thermoplastic polyurethane polymer compositions. The tertiary amines should be used in amounts wherein the nitrogen content, i.e., mole percent of nitrogen per total moles of the polyurethane forming components (chain extender, polyols, polyisocyanates, and catalyst), is sufficient to impart high melt strength and to cause the total reaction of NCO within desired time and temperature conditions. Examples of tertiary amines include, but are not limited to, diazabicyclooctane, tridodecylamine, trihexadecylamine, N,N'-dimethylalkyl amines, and the like. The alkyl or alkylene portions of the tertiary amines can be linear or branched and can have 1 to about 20 carbon atoms.

The tertiary amines can be utilized in the polyurethane compositions in amounts wherein the nitrogen content from the tertiary amine is generally at least about 0.06 mol %, desirably from about 0.075 to about 2 mol %, and preferably from about 0.1 to about 1.5 mol % based on the total moles of the polyurethane forming components (chain extenders, polyols, polyiscyanates, and catalyst) present in the composition.

Polyisocyanates

The polyurethane polymers of the present invention are formed from a polyurethane composition containing an isocyanate component. In order to form relatively long linear polyurethane chains, di-functional or polyfunctional isocyanates are utilized, with diisocyanates being preferred. Suitable polyisocyanates are commercially available from companies such as, but not limited to, Bayer Corporation of Pittsburgh, Pa., The BASF Corporation of Parsippany, N.J., The Dow Chemical Company of Midland, Mich., and Huntsman Chemical of Utah. The polyisocyanates of the present invention generally have a formula R(NCO)$_n$, where n is usually an integer of 2 to 4 and preferably 2. R can be an aromatic, cycloaliphatic, an aliphatic, or combinations thereof having from 2 to about 20 carbon atoms. Examples of polyisocyanates include, but are not limited to diphenylmethane-4,4'-diisocyanate (MDI); toluene-2,4-diisocyanate (TDI); toluene-2,6-diisocyanate (TDI); methylene bis(4-cyclohexylisocyanate (H$_{12}$MDI); 3-isocyanatomethyl-3,5,5-trimethyl-cyclohexyl isocyanate (IPDI); 1,6-hexane diisocyanate (HDI); naphthalene-1,5-diisocyanate (NDI); 1,3- and 1,4-phenylenediisocyanate; triphenylmethane-4,4',4"-triisocyanate; polyphenylpolymethylenepolyisocyanate (PMDI); m-xylene diisocyanate (XDI); 1,4-cyclohexyl diisocyanate (CHDI); isophorone diisocyanate; isomers, dimers, trimers and mixtures or combinations thereof. The preferred isocyanates are diphenylmethane-4,4'-diisocyanate (MDI) and H$_{12}$MDI which produce polyurethanes with superior UV resistance.

Chain Extenders

Chain extenders are desirably employed in the polyurethane forming compositions of the present invention generally to increase the molecular weight thereof, and are well known to the art and to the literature. Suitable chain extenders generally include organic diols or glycols having a total of from 2 to about 20 carbon atoms such as alkane diols, cycloaliphatic diols, alkylaryl diols, and the like. Alkane diols which have a total from about 2 to about 6 carbon atoms are often utilized with examples including ethanediol, propane glycol, 1,6-hexanediol, 1,3-butanediol, 1,5-pentanediol, neopentylglycol, and preferably 1,4-butanediol. Dialkylene ether glycols can also be utilized such as diethylene glycol and dipropylene glycol. Examples of suitable cycloaliphatic diols include 1,2-cyclopentanediol, 1,4-cyclohexanedimethanol (CHDM) and the like. Examples of suitable alkylaryl diols include hydroquinone di(β-hydroxyethyl)ether (HQEE), 1,4-benzenedimethanol, bisethoxy biphenol, bisphenol A ethoxylates, bisphenol F ethoxylates and the like. Still other suitable chain extenders are 1,3-di(2-hydroxyethyl)benzene, and 1,2-di(2-hydroxyethoxy)benzene. Mixtures of the above noted chain extenders can also be utilized.

The preferred chain extenders of the present invention include 1,4-butanediol, ethylene glycol, diethylene glycol, 1,6-hexane diol, 1,4-cyclohexanedimethanol (CHDM), hydroquinone di(β-hydroxyethyl)ether (HQEE), and 1,4-benzenedimethylol.

Chain extenders with functionality greater than 2 may also be used so long as the resulting TPU retains its thermoplasticity. Examples of such chain extenders include trimethyolpropane, glycerin and pentraerythritol. Generally, the addition of such chain extenders should not exceed 10% relative to the weight of the difunctional chain extenders.

The molar amount or ratio of the total hydroxyl groups of the one or more chain extenders utilized to the total hydroxyl groups of the polyol component set forth hereinbelow is generally from about 0.1 to about 3.0, desirably from about 0.15 to about 2.5, and preferably from about 0.2 to about 2.1.

Polyols

The thermoplastic polyurethanes of the present invention also are formed from a polyol component, preferably polyether polyols. Suitable hydroxyl terminated polyether intermediates or polyether polyols are derived from a diol or polyol having from 2 to about 15 carbon atoms and preferably from 2 to about 6 carbon atoms. The hydroxyl terminated polyether intermediates can be formed from reaction of an alkyl diol or glycol with an ether, such as an alkylene oxide having from 2 to about 6 carbon atoms. Examples of alkylene oxides include, but are not limited to, ethylene oxide, propylene oxide and tetramethylene oxide, or combinations thereof.

Accordingly, the polyether intermediate can be either a homopolymer or a copolymer. For example, a hydroxyl terminated polyether copolymer intermediate can be produced by first reacting propylene glycol with propylene oxide followed by a subsequent reaction with ethylene oxide. Examples of suitable polyether polyols include, but are not limited to, poly(ethylene glycol) which can be formed by reacting ethylene oxide with ethylene glycol; poly(propylene glycol), which can be formed by reacting propylene oxide with propylene glycol; poly(propyleneethylene glycol), which can be formed by reacting propylene oxide and ethylene oxide with propylene glycol; and poly(tetramethylene ether glycol) derived from tetrahydrofuran.

The polyols or polyether intermediates of the present invention have number average molecular weights generally from about 100 to about 10,000, desirably from about 250 to about 5,000, and preferably from about 500 to about 4,000. Blends of various polyols can be utilized in the present invention. Suitable polyether polyols are commercially available from Bayer Corporation as Arcol®, Acclaim® or Multranol®; Dupont as Terathane® PTMEG; Arch as Poly G®; and The BASF Corporation as PolyTHF. Preferred polyether polyols include polyethylene oxide and poly(tetramethylene oxide). Polyols or polyol mixtures other than polyether polyols such as, but not limited to, polyester polyols can also be utilized in small amounts in the present invention, but are not preferred.

The thermoplastic polyurethanes are generally formed from the reaction of 1) one or more polyisocyanates, 2) one or more polyols, 3) one or more chain extenders, and 4) a polyalcohol amine or tertiary amine catalyst. Numerous methods of forming polyurethane are known including the multi-step process of reacting the polyol component with the polyisocyanate component and then chain extending the same.

The thermoplastic polyurethanes of the present invention are preferably produced by the "one-shot" polymerization process as known in the art, wherein the polyol component, polyisocyanate component, the chain extender, and the catalyst are added together, mixed, and polymerized. Desirably, the polyol component, the chain extender, and the catalyst are added in one stream and the polyisocyanate is added in a second or later stream. Preferably, the one-shot polymerization process is performed in an extruder. The reaction is performed at temperatures generally from about 60° C. to about 220° C., desirably from about 100° C. to about 210° C., and preferably from about 120° C. to about 200° C. Temperatures above about 220° C. are generally avoided in order to prevent the polyurethanes from decomposing. Suitable mixing times in order to enable the various components to react and form the thermoplastic polyurethanes of the present invention are generally from about 1 to about 5 and desirably from about 2 to about 3 minutes.

The mole ratio of polyisocyanate functional groups to total hydroxyl groups of the polyol component and chain extender is generally from about 0.95 to about 1.10 and preferably from about 0.98 to about 1.03.

The weight average molecular weight of the polymerized thermoplastic polyurethanes of the present invention generally range from about 50,000 to about 1,000,000, desirably from about 75,000 to about 500,000, and preferably from about 100,000 to about 300,000. The polyurethanes of the present invention have a hardness generally about 98 Shore A or less.

In addition to the above-identified components, the polyurethane compositions of the present invention can also contain various additives, pigments, dyes, fillers, lubricants, UV absorbers, waxes, antioxidants, thickening agents and the like, which can be utilized in conventional amounts as known to the art and to the literature. The additives utilized generally impart desired properties to the thermoplastic polyurethanes. Fillers include talc, silicates, clays, calcium carbonate, and the like.

If it is desired that the polyurethane composition of the present invention have a color or hue, any conventional pigment or dye can be utilized in conventional amounts. Hence, any pigment known to the art and to the literature can be utilized as for example titanium dioxide, iron oxide, carbon black, and the like, as well as various dyes provided that they do not interfere with the various urethane reactions.

The resulting thermoplastic polyurethanes can be extruded into any desired end product or form, or can be cooled and pelletized or granulated for storage or bulk shipping. The extrudate can be immediately processed in some other manner after extrusion to give a desired final end use product.

The thermoplastic polyurethanes of the present invention advantageously are suitable for many applications, including, but not limited to, membranes, breathable films or sheets which can be utilized for house wrap, roofing materials, or protective clothing, and films for lamination.

The monolithic sheets or films formed from polyurethane compositions of the present invention are advantageously suitable for use as protective clothing as they allow moisture vapor a passageway from one side of the film to the other. It is desirable to have garments that are to be worn in the rain or when participating in sports that keep the wearer dry by preventing the leakage of water into the garment, yet at the same time allow perspiration to evaporate from the wearer through the clothing to the atmosphere. The "breathable" TPU materials allow the perspiration to evaporate and in the preferred embodiment the polyurethane sheets of the present invention are apertureless and free or substantially free of punctures or porosity so as to prevent water from penetrating the garment. The polyurethane sheets and films are breathable and have a high affinity for water ($H_2O$) vapor molecules believably due to the built in ethylene or other oxide units in their backbones from the polyol component. This high affinity attracts water vapor molecules that are absorbed by the film via hydrogen bonding. Subsequently, the water vapor diffuses through the film, generally due to osmotic pressure, to the film side where vapor pressure is lower. The sheets or films thus selectively allow water vapor to pass therethrough but do not allow bulk passage of water.

The moisture vapor transmission rate of the polyurethane films 1 mil thick of the present invention as measured by ASTM E968 (23° C. 50% relative humidity) is generally greater than about 100 $g/m^2$ per day, desirably greater than about 200 $g/m^2$ per day, and preferably greater than about 300 $g/m^2$ per day.

Previously, films which have been utilized in house wrap applications included breathable fabrics or polyolefin films which were perforated and porous in order to make them breathable. Advantageously, as stated above, sheets and films of the present invention are breathable even when unperforated. Sheets and films of the present invention can be formed in any desired thickness, and when used for house wrap, in garments, or similar applications, are generally from about 0.5 mils to about 10 mils, and preferably from about 1 mil to about 4 mils in thickness. The sheets and films of the present invention can optionally have a backing layer applied thereto. The backing layer can be any woven or nonwoven substrate such as paper or cellulose product, and polymer backings such as polyethylene, polypropylene, nylon or polyester. Optionally, an adhesive can be utilized to adhere sheets or films of the present invention to a backing layer.

As stated above, the films of the present invention are flexible and have excellent physical properties especially against water leaks commonly found in present microporous films.

The present invention will be better understood by reference to the following examples which serve to illustrate the invention, but not to limit the same.

EXAMPLES

Tables I and II illustrate various polyurethane formulations including those formed with polyalcohol amine catalysts as well as comparative prior art organometallic catalysts.

Thermoplastic polyurethane polymers were prepared by a random melt polymerization method. In this method, the polyol, chain extender and catalyst were blended together at about 60° C. The blend was then heated to the temperature indicated in Tables I and II. The polyisocyanate, MDI was heated to the temperature indicated in the tables and then mixed with the blend. The reactants were vigorously mixed for the indicated times. During the course of the reaction, the exotherm of a properly catalyzed system results in an increase in temperature typically greater than 70° C. The polymer was discharged into a cooled pan and allowed to cool to room temperature. The melt index (MI) of the polymer was tested immediately and following oven aging as indicated in the tables.

Examples M (Table I) and P–T (Table II) are examples of the invention. Examples A–L, N, O, U and V are comparative examples utilizing organometallic catalysts or low levels of a tertiary amine. The data in Table I indicate that few samples are sufficiently catalyzed to result in TPUs that have no detectable residual NCO following oven aging. The only examples that do are B, L, and M. B is made with a tin-based catalyst and L has unacceptably high immediate NCO values and are not examples of the invention, while M involves the use of a metal-free catalyst at sufficiently high levels to result in a TPU with an immediate NCO value less than 0.3 percent. Catalysts based on metal other than tin were explored and are illustrated by examples D–G, I, K. Neither the bismuth- nor titanium-based catalyzed resulted in TPUs that meet the above criteria. Even at much higher levels than the organotin catalyst, the bismuth and titanium catalysts are not effective in satisfactorily producing quality TPUs, nor do examples U and V in Table II. In the case of compositions U and V, the low levels of polyalcohol amine result in TPUs that have immediate NCO values greater than 0.3. Table II contains 2 examples of what is possible with organotin catalysts (N and O) and that TPU of similar composition but made with a polyalcohol amine (P, R–T) are thermoplastic and exhibit comparable or lower MIs. This is accomplished while maintaining the high level of MVT exhibited by the organotin catalyzed systems as demonstrated by comparing two sets of TPUs each of which contains the same amount of BDO, i.e., examples N and T and examples B, M, O and Q. Accordingly, thermoplastic polyurethanes can be prepared having desirable properties such as excellent melt indexes and moisture vapor transmission, while being free of environmentally unfriendly metal-based catalyst.

The Brookfield viscosities were run at 4 RPM using spindle #2. The NCO values were calculated utilizing ASTM procedure D5155-96. The moisture vapor transmission MVT values were calculated utilizing ASTM procedure E968.

TABLE I

| Example | A | B | C | D | E | F | G |
|---|---|---|---|---|---|---|---|
| PEG 1500 (g) | 271.06 | 271.06 | 271.06 | 271.06 | 271.06 | 271.06 | 271.06 |
| 1,4-BDO (g) | 28.94 | 28.94 | 28.94 | 28.94 | 28.94 | 28.94 | 28.94 |
| MDI (g) | 126.15 | 126.02 | 126.08 | 126.1 | 125.98 | 126.00 | 125.89 |
| DBTDL (g) | — | 25 ppm | — | — | — | — | — |
| Diazabicyclooctane | — | — | 25 ppm | — | — | — | — |
| Bismuth neodecanoate | — | — | — | 25 ppm | 100 ppm | 200 ppm | — |
| Titanium(IV) 2-ethylhexoxide | — | — | — | — | — | — | 200 ppm |
| Irganox 245 (g) | 1.50 | 1.50 | 1.50 | 1.50 | — | — | — |
| Mol % N (from catalyst) | — | — | .0134 | — | — | — | — |
| Polyol blend temperature © | 120 | 120 | 120 | 120 | 120 | 120 | 120 |
| MDI temperature © | 120 | 120 | 120 | 120 | 120 | 120 | 120 |
| Reaction time (min) | 2 | 2 | 2 | 2 | 2 | 2 | 2 |
| Stoichiometry | 99.2 | 99.1 | 99.2 | 99.2 | 99.1 | 99.1 | 99.0 |
| Reaction exotherm temperature © | 190 | 205 | 193 | 190 | 190 | 190 | 190 |
| immediate NCO (THF) | .324 | .142 | .306 | .552 | 0.494 | 0.646 | 0.507 |
| immediate MI (190 C./3800 g) | 123.7 | 7.84 | 32.87 | 39.24 | 38.83 | 67.89 | 63.80 |
| immediate MI (190 C./8700 g) | not run | 24.07 | not run | not run | not run | not run | not run |
| Oven aged NCO (THF) | 0.063 | 0.00 | 0.032 | 0.021 | 0.021 | 0.042 | 0.042 |
| Oven aged (105 C. 2 hr) MI (190 C./3800 g) | 9.19 | 3.41 | 7.27 | 7.1 | 9.59 | 20.92 | 27.15 |
| Oven aged (105 C. 2 hr) MI (190 C./8700 g) | 28.67 | 13.69 | 29.78 | 25.99 | 41.69 | not run | not run |
| Brookfield Viscosity (15% in THF) | 2760 | 2450 | 3100 | 1830 | 1470 | 640 | 340 |
| Brookfield Viscosity (15% in NMP) | 550 | 5330 | 1060 | 800 | 650 | 470 | 510 |
| MVT (Upright cup, 23 C., 50% rh) | not run | 610 | not run | not run | not run | not run | not run |

| Example | H | I | J | K | L | M |
|---|---|---|---|---|---|---|
| PEG 1500 (g) | 271.06 | 271.06 | 271.06 | 271.06 | 271.06 | 271.06 |
| 1,4-BDO (g) | 28.94 | 28.94 | 28.94 | 28.94 | 28.94 | 28.94 |
| MDI (g) | 125.84 | 126.05 | 126.06 | 126.04 | 126.06 | 126.07 |
| DBTDL (g) | — | — | — | — | — | — |
| Diazabicyclooctane | — | — | — | — | 100 ppm | 200 ppm |
| Bismuth neodecanoate | — | 100 ppm | — | 100 ppm | — | — |
| Titanium(IV) 2-ethylhexoxide | — | — | — | — | — | — |
| Irganox 245 (g) | — | — | — | — | — | — |
| Mol % N (from catalyst) | — | — | — | — | .0536 | 0.1072 |
| Polyol blend temperature © | 90 | 90 | 150 | 150 | 120 | 120 |
| MDI temperature © | 90 | 90 | 120 | 120 | 120 | 120 |
| Reaction time (min) | 3 | 3 | 2 | 2 | 2 | 2 |
| Stoichiometry | 98.9 | 99.2 | 99.2 | 99.2 | 99.2 | 99.2 |
| Reaction exotherm temperature © | 162 | 162 | 215 | 215 | 195 | 198 |
| immediate NCO (THF) | 1.05 | 1.25 | 0.439 | 0.436 | 0.376 | 0.072 |
| immediate MI (190 C./3800 g) | 90.41 | 121.66 | 19.93 | 14.84 | 15.38 | 11.04 |
| immediate MI (190 C./8700 g) | not run | not run | 48.54 | 39.16 | 36.36 | 33.21 |
| Oven aged NCO (THF) | 0.124 | 0.124 | 0.021 | 0.041 | 0.00 | 0.00 |

TABLE I-continued

| | | | | | | |
|---|---|---|---|---|---|---|
| Oven aged (105 C. 2 hr) MI (190 C./3800 g) | 54.67 | 80.02 | 1.70 | <1.0 | 6.80 | 10.08 |
| Oven aged (105 C. 2 hr) MI (190 C./8700 g) | not run | not run | 8.20 | 3.44 | 21.00 | 37.43 |
| Brookfield Viscosity (15% in THF) | 50.00** | 50.00** | GEL | GEL | 5330 | 1980 |
| Brookfield Viscosity (15% in NMP) | not run | not run | not run | not run | 2050 | 2680 |
| MVT (Upright cup, 23 C., 50% rh) | not run | not run | not run | not run | not run | 620 |

**solutions were milky

TABLE II

| Sample | N | O | P | Q | R | S | T | U | V |
|---|---|---|---|---|---|---|---|---|---|
| PEG-1500 (g) | 174.00 | 179.68 | 179.56 | 179.68 | 180.08 | 171.88 | 173.40 | 179.63 | 179.62 |
| Dibutyltindilaurate (g) | 0.01 | 0.004 | — | — | — | — | — | — | — |
| Diazabicyclooctane (g) | — | — | — | 0.04 | — | — | — | — | — |
| Triethanolamine (g) | — | — | 0.12 | — | 0.60 | 0.12 | 0.60 | 0.050 | 0.060 |
| 1,4-BDO (g) | 28.00 | 19.32 | 19.32 | 19.32 | 19.32 | 28.00 | 28.00 | 19.32 | 19.32 |
| Irganox 245 (g) | 1.00 | 1.00 | 1.00 | 1.00 | 1.00 | 1.00 | 1.00 | 1.00 | 1.00 |
| MDI (g) | 108.5 | 85.4 | 85.42 | 84.56 | 86.7 | 108.5 | 109.7 | 85.50 | 85.40 |
| Mol % N (from catalyst) | — | — | 0.3194 | 0.2133 | 1.5753 | 0.2511 | 1.2399 | 0.1333 | 0.1599 |
| Blend temp (C.) | 120 | 120 | 120 | 120 | 120 | 120 | 120 | 120 | 120 |
| MDI temp (C.) | 120 | 120 | 120 | 120 | 120 | 120 | 120 | 120 | 120 |
| Reaction time (min) | 3 | 3 | 3 | 3 | 3 | 3 | 3 | 3 | 3 |
| TEOA/BDO mole ratio | 0.000 | 0.00 | 0.004 | 0.00 | 0.019 | 0.003 | 0.013 | 0.002 | 0.002 |
| Stoichiometry | 100.6 | 100.23 | 99.95 | 99.24 | 100.5 | 100.6 | 100.7 | 100.5 | 100.5 |
| Immediate MI (190 C./3800 g) | 42 | 28 | 42 | 13 | 15 | 27 | 8 | 48 | 40 |
| Oven aged (105 C. 2 hr) MI (190 C./3800 g) | 40 | 24 | 20 | 28 | 10 | 25 | 6 | 36 | 10 |
| Immediate % NCO | 0.15 | 0.11 | 0.15 | 0.11 | 0.21 | 0.29 | 0.18 | 0.35 | 0.36 |
| Brookfield Viscosity (15% in THF) | not run | 650 | 700 | 750 | not run | not run | not run | 1100 | 700 |
| Trouser tear (lbf/in) ASTM D624-00 | 85 | 72 | 73 | not run | 65 | 78 | 85 | not run | not run |
| Tensile set (200%, 23 C.) ASTM D412-98 | 15 | 10 | 7 | not run | 10 | 14 | 11 | not run | not run |
| Tensile strength (psi) ASTM D412-98 | 1810 | 960 | 1110 | not run | 1600 | 2550 | 3420 | not run | not run |
| % elongation ASTM D412-98 | 760 | 640 | 600 | not run | 970 | 760 | 630 | not run | not run |
| tensile modulus (psi) at 50% strain | 560 | 290 | 240 | not run | 260 | 500 | 520 | not run | not run |
| tensile modulus (psi) at 100% strain | 670 | 360 | 320 | not run | 340 | 620 | 660 | not run | not run |
| tensile modulus (psi) at 200% strain | 810 | 460 | 430 | not run | 450 | 790 | 900 | not run | not run |
| tensile modulus (psi) at 300% strain | 990 | 550 | 550 | not run | 560 | 1020 | 1290 | not run | not run |
| tensile modulus (psi) at 400% strain | 1190 | 560 | 720 | not run | 700 | 1340 | 1830 | not run | not run |
| tensile modulus (psi) at 500% strain | 1390 | — | 910 | not run | 870 | 1700 | — | not run | not run |
| MVT (upright cup, 23 C. 50% rh) | 510 | 600 | not run | 620 | not run | not run | 490 | not run | not run |

In accordance with the patent statutes, the best mode and preferred embodiment have been set forth, the scope of the invention is not limited thereto, but rather by the scope of the attached claims.

What is claimed is:

1. An article comprising:
a breathable polyurethane layer; and
a substrate layer attached to said polyurethane layer, said substrate layer comprising a woven or nonwoven material, said polyurethane layer comprising the reaction product of a) at least one polyether polyol, b) at least one polyisocyanate, c) at least one chain extender, and d) at least one polyalcohol amine catalyst, wherein said polyurethane layer has a nitrogen content from said polyalcohol amine catalyst in an amount from about 0.075 to about 2 mol % based on the total moles of said polyol, said polyisocyanate, said chain extender, and said catalyst, and wherein said polyalcohol amine catalyst is triethanolamine, bis(2-hydroxyethyl)amino-2-propanol, 2-bis(2-hydroxyethyl)amino-2-(hydroxyethyl)-1,3-propanediol, or 1,3-bis[tris(hydroxymethyl)methylamino]propane, or a combination thereof.

2. The article according to claim 1, wherein said substrate layer is a natural fiber material or a polymer, or a combination thereof.

3. The article according to claim 2, wherein said substrate polymer is polyethylene, polypropylene, nylon, or polyester, or wherein said substrate is paper or cellulose.

4. The article according to claim 1, wherein said polyurethane polymer is substantially free of an organometallic catalyst.

5. The article according to claim 1, wherein a molar ratio of total hydroxyl groups of the at least one chain extender to total hydroxyl groups of the at least one polyol is from about 0.1 to about 3.0, wherein a molar ratio of polyisocyanate functional groups to total hydroxyl groups of the at least one polyol and at least one chain extender is from about 0.95 to about 1.10, and wherein said chain extender is an organic diol or glycol having a total of from 2 to about 20 carbon atoms.

6. The article according to claim 1, wherein said chain extender is an alkane diol, cycloaliphatic diol, or an alkyl aryl diol, and wherein said at least one polyisocyanate is a diisocyanate, wherein said polyurethane polymer has a nitrogen content from said polyalcohol amine catalyst in an amount from about 0.095 to about 1.5 mol % based on the total moles of said polyol, said polyisocyanate, said chain extender and said catalyst.

7. The article according to claim 5, wherein said chain extender is an alkane diol, cycloaliphatic diol, or an alkyl aryl diol, and wherein said at least one polyisocyanate is a diisocyanate, wherein said polyurethane polymer has a nitrogen content from said polyalcohol amine catalyst in an amount from about 0.095 to about 1.5 mol % based on the total moles of said polyol, said polyisocyanate, said chain extender and said catalyst, wherein said polyol is polyethylene glycol and wherein said polyol has a number average molecular weight from about 100 to about 4,000.

8. The article according to claim 1, wherein said polyurethane layer is from about 0.5 mils to about 10 mils thick.

9. The article according to claim 8, wherein said polyurethane layer is from about 0.5 mils to about 10 mils thick, wherein said polyol is polyethylene glycol and wherein said polyol has a number average molecular weight from about 100 to about 4,000.

10. The article according to claim 7, wherein said polyurethane layer is from about 0.5 mils to about 10 mils thick.

11. The article according to claim 1, wherein said article is housewrap, part of a garment, or a roofing material, and wherein said substrate layer and polyurethane layer are connected by an adhesive or directly connected to each other.

12. The article according to claim 7, wherein said article is housewrap, part of a garment, or a roofing material, and wherein said substrate layer and polyurethane layer are connected by an adhesive or directly connected to each other.

13. The article according to claim 1, wherein said polyurethane layer has moisture vapor transmission rate of greater than about 100 $g/m^2$ per day.

14. The article according to claim 2, wherein said polyurethane layer has moisture vapor transmission rate of greater than about 100 $g/m^2$ per day, wherein said polyol is polyethylene glycol and wherein said polyol has a number average molecular weight from about 100 to about 4,000.

15. The article according to claim 3, wherein said polyurethane layer has moisture vapor transmission rate of greater than about 100 $g/m^2$ per day.

16. The article according to claim 12, wherein said polyurethane layer has moisture vapor transmission rate of greater than about 100 $g/m^2$ per day.

17. The article according to claim 1, wherein said substrate layer is woven polyester or nylon, or nonwoven polyester or polypropylene.

18. The article according to claim 8, wherein said substrate layer is woven polyester or nylon, or nonwoven polyester or polypropylene.

* * * * *

UNITED STATES PATENT AND TRADEMARK OFFICE
CERTIFICATE OF CORRECTION

| | | |
|---|---|---|
| PATENT NO. | : 6,984,709 B2 | |
| APPLICATION NO. | : 10/325101 | |
| DATED | : January 10, 2006 | |
| INVENTOR(S) | : Donald A. Meltzer et al. | |

It is certified that error appears in the above-identified patent and that said Letters Patent is hereby corrected as shown below:

In claim 1, column 11, line 63, delete "ethyl)-1,3-propanediol," and substitute --methyl)-1,3-propanediol,--.

Signed and Sealed this

Twentieth Day of March, 2007

JON W. DUDAS
*Director of the United States Patent and Trademark Office*